US008288465B2

(12) United States Patent
Kato et al.

(10) Patent No.: US 8,288,465 B2
(45) Date of Patent: Oct. 16, 2012

(54) POLYVINYL CHLORIDE RESIN COMPOSITIONS AND MANUFACTURING METHOD THEREFOR

(75) Inventors: Masaki Kato, Tainai (JP); Akira Tsuboi, Kurashiki (JP); Masato Nakamae, Kurashiki (JP); Robert Fuss, Frankfurt am Main (DE); Samuel Michel, Frankfurt am Main (DE)

(73) Assignees: Kuraray Co., Ltd., Kurashiki-shi (JP); Kuraray Europe GmbH, Frankfurt am Main (DE)

( * ) Notice: Subject to any disclaimer, the term of this patent is extended or adjusted under 35 U.S.C. 154(b) by 0 days.

(21) Appl. No.: 13/123,386

(22) PCT Filed: Oct. 5, 2009

(86) PCT No.: PCT/JP2009/067326
§ 371 (c)(1),
(2), (4) Date: Apr. 8, 2011

(87) PCT Pub. No.: WO2010/041620
PCT Pub. Date: Apr. 15, 2010

(65) Prior Publication Data
US 2011/0201737 A1 Aug. 18, 2011

(30) Foreign Application Priority Data

Oct. 8, 2008 (JP) .................................. 2008-262302

(51) Int. Cl.
*C08K 5/00* (2006.01)
*C08K 5/10* (2006.01)
(52) U.S. Cl. ........................................ 524/399; 524/317
(58) Field of Classification Search ................... 524/399
See application file for complete search history.

(56) References Cited

U.S. PATENT DOCUMENTS

| 4,963,608 | A | 10/1990 | Kunieda et al. |
| 6,635,709 | B2 | 10/2003 | Kato et al. |
| 6,806,305 | B2 | 10/2004 | Kato et al. |
| 7,070,731 | B2 | 7/2006 | Kato et al. |
| 2003/0008972 | A1 * | 1/2003 | Kato et al. ............... 525/56 |
| 2006/0180956 | A1 | 8/2006 | Kato et al. |
| 2009/0111940 | A1 | 4/2009 | Kato et al. |
| 2010/0041828 | A1 | 2/2010 | Kato et al. |
| 2010/0190890 | A1 | 7/2010 | Michel et al. |
| 2010/0324198 | A1 | 12/2010 | Nii et al. |

FOREIGN PATENT DOCUMENTS

| EP | 1 433 794 A1 | 6/2004 |
| JP | 50 92947 | 7/1975 |
| JP | 54 81359 | 6/1979 |
| JP | 57 147552 | 9/1982 |
| JP | 60 238345 | 11/1985 |
| JP | 61-108602 A | 5/1986 |
| JP | 1 178543 | 7/1989 |
| JP | 6-211909 A | 8/1994 |
| JP | 6 286012 | 10/1994 |
| JP | 6 287387 | 10/1994 |
| JP | 6-329858 A | 11/1994 |
| JP | 9 3286 | 1/1997 |
| JP | 9 31281 | 2/1997 |
| JP | 09031281 A * | 2/1997 |
| JP | 2002 97210 | 4/2002 |
| WO | 2009 010578 | 1/2009 |

OTHER PUBLICATIONS

Translation of JP 09031281, Feb. 1997.*
Lee et al., Journal of Materials Science Letters, 22, 1291-1293, 2003.*
U.S. Appl. No. 13/142,001, filed Jun. 24, 2011, Nakamae, et al.
International Search Report issued Dec. 15, 2009 in PCT/JP09/67326 filed Oct. 5, 2009.
Iida, Takeo et al., "Synergetic Effects of Poly (vinyl alcohols)s with Synergetic Metal Soap on the Stabilization of Poly (vinyl chloride)", Journal of Polymer Science and Technology, vol. 47, No. 3, pp. 197-205, (Mar. 1990), (with English abstract).
Iida, Takeo et al., "Synergetic Effects of Saponificated Poly (vinyl acetate)s Synergetic Metal Soap on the Stabilization of Poly(vinyl chloride)", Journal of Polymer Science and Technology, vol. 47, No. 6, pp. 509-516, (Jun. 1990), (with English abstract).
Iida, Takeo et al., Synergetic Effects of Ethylene-Vinyl Alcohol Copolymers with Synergetic Metal Soap on the Stabilization of Poly-(vinyl chloride), Journal of Polymer Science and Technology, vol. 50, No. 2, pp. 65-72, (Feb. 1993), (with English abstract).
Ikeda, Hirohisa et al., "Dispersibility of Macromolecular Polyols as Co-Stabilizer in Poly(vinyl Chloride) and their Stabilization Effect Combined with Synergetic Metal Soap", Polymers & Polymer Composite, vol. 11, No. 8, pp. 649-662, (Mar. 13, 2003).
Nakamura, Yoshinobu et al., "Morphology and Mechanical Properties of PVC/PVA Blend", Journal of the Adhesion Society of Japan, vol. 43, No. 2, pp. 43-49, (2007), (with English abstract).
U.S. Appl. No. 12/999,020, filed Dec. 14, 2010, Kato, et al.
U.S. Appl. No. 12/999,147, filed Dec. 15, 2010, Kato, et al.
U.S. Appl. No. 12/999,167, filed Dec. 15, 2010, Kato, et al.
U.S. Appl. No. 12/999,346, filed Dec. 16, 2010, Kato, et al.
Supplementary European Search Report dated Feb. 22, 2012, issued in corresponding EP patent application No. 09819154.7.

* cited by examiner

*Primary Examiner* — Hui Chin
(74) *Attorney, Agent, or Firm* — Oblon, Spivak, McClelland, Maier & Neustadt, L.L.P.

(57) ABSTRACT

A polyvinyl chloride resin composition contains: from 0.005 to 5 parts by weight of a polyvinyl alcohol having a viscosity average degree of polymerization of from 100 to 3000 and having a ratio Mw/Mn of a weight average molecular weight Mw to a number average molecular weight Mn of from 2.2 to 4.9; and from 0.01 to 5 parts by weight of a zinc compound, based on 100 parts by weight of a polyvinyl chloride resin. A polyvinyl chloride resin composition is thereby provided that enables to obtain a shaped article thereof excellent in thermal stability while being shaped and less colored.

20 Claims, No Drawings

POLYVINYL CHLORIDE RESIN COMPOSITIONS AND MANUFACTURING METHOD THEREFOR

TECHNICAL FIELD

The present invention relates to a polyvinyl chloride resin composition that is preferably used in applications for foods, medical use, household goods, and the like, and particularly, relates to a polyvinyl chloride resin composition that is good in thermal stability and is less colored.

BACKGROUND ART

Polyvinyl chloride resins are processed for shaping by blending a stabilizer of Ca—Zn base, Ba—Zn base, and the like therein, and are widely used as general molding materials and further as materials for products suitable for foods, medical use, and the like. Since shaped articles obtained only by blending these stabilizers are poor in abilities to inhibit heat deterioration, they used to have disadvantages, such as impairing initial colorability of the shaped articles and having not sufficient thermal stability of the shaped articles. Therefore, as a means for improvement of these disadvantages, polyvinyl chloride resin compositions are proposed to which an antioxidant is added or a compound having a hydroxyl group is added.

Patent Document 1 (JP 50-92947A) discloses a method of adding calcium soap, zinc soap, polyol or a derivative thereof, and a neutral inorganic calcium salt to a chloride-containing resin. Patent Document 2 (JP 54-81359A) discloses a method of adding a water soluble polymer to a chloride-containing polymer. Patent Document 3 (JP 57-147552A) discloses a method of adding a condensation reaction product of dipentaerythritol and dicarboxylic acid, zinc oxide, zinc carbonate or fatty acid zinc, and hydrotalcite to a chloride-containing resin.

Patent Document 4 (JP 60-238345A) discloses a method of adding a saponified product of an ethylene-vinyl acetate copolymer, having an ethylene unit content of from 20 to 50% and having a degree of saponification of a vinyl acetate unit of 96% or more, and a hydrotalcite-based compound to a thermoplastic resin. Patent Document 5 (JP 1-178543A) discloses a method of adding metal soap and a saponified product of an ethylene-vinyl acetate copolymer that has an ethylene content of from 20 to 75 mol % and has a degree of saponification of a vinyl acetate portion of 50 mol % or more to a halogen-containing thermoplastic resin.

Patent Document 6 (JP 6-287387A) discloses a method of adding a metal salt of an organic acid and acetalized polyvinyl alcohol to a vinyl chloride-based resin. Patent Document 7 (JP 9-3286A) discloses a method of adding a partially saponified polyvinyl alcohol having a degree of saponification of from 70 to 95 mol %, having an average degree of polymerization of from 300 to 2000, and having a terminal mercapto group to a vinyl chloride-based resin. Patent Document 8 (JP 9-31281A) discloses a method of adding a zinc compound, hydrotalcites, a polyvinyl alcohol, and polymethyl methacrylate to a vinyl chloride-based resin.

Non-Patent Document 1 (Japanese Journal of Polymer Science and Technology Vol. 47, No. 3, p. 197 (1990)) discloses a method of adding zinc stearate-calcium stearate complex soap and a completely saponified polyvinyl alcohol having a degree of polymerization of 600 or more to a polyvinyl chloride. Non-Patent Document 2 (Japanese Journal of Polymer Science and Technology Vol. 47, No. 6, p. 509 (1990)) discloses a method of adding zinc stearate-calcium stearate complex soap and a partially saponified polyvinyl alcohol having a degree of polymerization of 500 and having a degree of saponification of 73.6 mol % to a polyvinyl chloride.

Non-Patent Document 3 (Japanese Journal of Polymer Science and Technology Vol. 50, No. 2, p. 65 (1993)) discloses a method of adding zinc stearate-calcium stearate complex soap and an ethylene-vinyl alcohol copolymer having an ethylene content of 29 mol % or more to a polyvinyl chloride. Non-Patent Document 4 (Polymers & Polymer Composites, Vol. 11, p. 649 (2003)) discloses a method of adding zinc stearate-calcium stearate complex soap, and a polyvinyl alcohol having a degree of polymerization of 500 and having a degree of saponification of 98.5 mol % or an ethylene-vinyl alcohol copolymer having an ethylene content of 29 mol % or more to a polyvinyl chloride.

Non-Patent Document 5 (Journal of the Adhesion Society of Japan Vol. 43, No. 2, p. 43 (2007)) discloses a method of adding a polyvinyl alcohol having a degree of polymerization of 500 and having a degree of saponification of 88 mol % or a polyvinyl alcohol having a degree of polymerization of 1700 and having a degree of saponification of 78 mol % or more, and polymethyl methacrylate to a polyvinyl chloride.

However, the polyvinyl chloride resin compositions described in Patent Documents 1 through 8 and Non-Patent Documents 1 through 5 have problems of not being sufficient in long term thermal stability and of being colored.

PRIOR ART DOCUMENTS

Patent Documents

Patent Document 1: JP 50-92947A
Patent Document 2: JP 54-81359A
Patent Document 3: JP 57-147552A
Patent Document 4: JP 60-238345A
Patent Document 5: JP 1-178543A
Patent Document 6: JP 6-287387A
Patent Document 7: JP 9-3286A
Patent Document 8: JP 9-31281A

Non-Patent Documents

Non-Patent Document 1: Japanese Journal of Polymer Science and Technology Vol. 47, No. 3, p. 197 (1990)
Non-Patent Document 2: Japanese Journal of Polymer Science and Technology Vol. 47, No. 6, p. 509 (1990)
Non-Patent Document 3: Japanese Journal of Polymer Science and Technology Vol. 50, No. 2, p. 65 (1993)
Non-Patent Document 4: Polymers & Polymer Composites, Vol. 11, p. 649 (2003)
Non-Patent Document 5: Journal of the Adhesion Society of Japan Vol. 43, No. 2, p. 43 (2007)

SUMMARY OF THE INVENTION

Problems to be Solved by the Invention

It is an object of the present invention to provide a polyvinyl chloride resin composition that is excellent in thermal stability and is less colored.

Means for Solving the Problems

As a result of intensive studies, the present inventors have found that it is possible to keep sufficient thermal stability while being shaped and also make a less colored shaped article thereof by blending specific amounts of a polyvinyl alcohol (hereinafter, may be abbreviated as a PVA) having a viscosity average degree of polymerization of from 100 to 3000 and having a ratio Mw/Mn of a weight average molecular weight Mw to a number average molecular weight Mn of from 2.2 to 4.9 and a zinc compound to a polyvinyl chloride resin, and thus have come to complete the present invention.

That is, the present invention is a polyvinyl chloride resin composition comprising: from 0.005 to 5 parts by weight of a polyvinyl alcohol having a viscosity average degree of polymerization of from 100 to 3000 and having a ratio Mw/Mn of a weight average molecular weight Mw to a number average molecular weight Mn of from 2.2 to 4.9; and from 0.01 to 5 parts by weight of a zinc compound, based on 100 parts by weight of a polyvinyl chloride resin. At this time, it is preferred that the polyvinyl alcohol is formed by saponifying a polyvinyl ester having a ratio of vinyl ester units of 95 mol % or more.

In the present invention, it is preferred that the polyvinyl alcohol is formed by blending two or more types of polyvinyl alcohols having viscosity average degrees of polymerization different in 500 or more.

In the present invention, it is preferred to further comprise from 0.001 to 10 parts by weight of a lubricant based on 100 parts by weight of the polyvinyl chloride resin. At this time, it is preferred that the lubricant is a fatty acid ester of polyol, and among all, it is more preferred that it is glycerin monostearate.

The present invention is also a method of producing a polyvinyl chloride resin composition, comprising adding: from 0.005 to 5 parts by weight of a polyvinyl alcohol having a viscosity average degree of polymerization of from 100 to 3000 and having a ratio Mw/Mn of a weight average molecular weight Mw to a number average molecular weight Mn of from 2.2 to 4.9; and from 0.01 to 5 parts by weight of a zinc compound, based on 100 parts by weight of a polyvinyl chloride resin. At this time, it is preferred that the polyvinyl alcohol is formed by blending two or more types of polyvinyl alcohols having viscosity average degrees of polymerization different in 500 or more.

Effects of the Invention

The polyvinyl chloride resin composition of the present invention is excellent in thermal stability and is less colored. Accordingly, a less colored shaped article can be obtained by melt molding the polyvinyl chloride resin composition, and the industrial value thereof is extremely high.

MODE FOR CARRYING OUT THE INVENTION

A polyvinyl chloride resin used in the present invention may be a homopolymer of vinyl chloride and may also be a copolymer of 50 weight % or more of vinyl chloride and a monomer that is copolymerizable therewith. The monomer copolymerized with vinyl chloride may include vinyl esters, such as vinyl acetate and vinyl propionate; (meth)acrylic esters, such as methyl acrylate and ethyl acrylate; olefins, such as ethylene and propylene; maleic anhydride; acrylonitrile; styrene; vinylidene chloride; and the like.

As a method of producing the polyvinyl chloride resin using these monomers, it is possible to preferably employ a method of suspension polymerizing the monomer in the presence of a polymerization initiator. In such a case, a normally used dispersion stabilizer is used that is, for example, a water soluble polymer, such as a water soluble cellulose ether, like methylcellulose, hydroxyethyl cellulose, hydroxypropyl cellulose, hydroxypropyl methylcellulose, or the like, a polyvinyl alcohol, or gelatin; an oil soluble emulsifier, such as sorbitan monolaurate, sorbitan trioleate, glycerin tristearate, and an ethylene oxide-propylene oxide block copolymer; a water soluble emulsifier, such as polyoxyethylene sorbitan monolaurate, polyoxyethylene glycerin oleate, or sodium laurate; and the like. Among them, a polyvinyl alcohol having a degree of saponification of from 65 to 99 mol % and having a degree of polymerization of from 500 to 4000 is preferably used. It is preferably added from 0.01 to 2.0 parts by weight based on 100 parts by weight of vinyl chloride. Although the dispersion stabilizer for suspension polymerization may be used singly, a polyvinyl alcohol having a degree of polymerization of from 100 to 4000 and having a degree of saponification of from 30 to 99 mol %, which is normally used in combination for suspension polymerizing a vinyl compound, such as vinyl chloride, in an aqueous medium, may also be used together. Although the amount thereof to be added is not particularly limited, it is preferred to be from 0.01 to 2.0 parts by weight based on 100 parts by weight of a vinyl compound, such as vinyl chloride.

As an initiator used for the polymerization, an oil soluble or water soluble polymerization initiator can be used that has been used for polymerization of vinyl chloride or the like conventionally. The oil soluble polymerization initiator may include, for example, percarbonate compounds, such as diisopropyl peroxydicarbonate, di-2-ethylhexyl peroxydicarbonate, and diethoxyethyl peroxydicarbonate; perester compounds, such as t-butyl peroxyneodecanoate, t-butyl peroxypivalate, t-hexyl peroxypivalate, and α-cumyl peroxyneodecanoate; peroxides, such as acetyl cyclohexyl sulfonyl peroxide, 2,4,4-trimethylpentyl-2-peroxyphenoxyacetate, 3,5,5-trimethyl hexanoyl peroxide, and lauroyl peroxide; azo compounds, such as azobis(2,4-dimethylvaleronitrile) and azobis(4-methoxy-2,4-dimethylvaleronitrile), and the like. The water soluble polymerization initiator may include, for example, potassium persulfate, ammonium persulfate, hydrogen peroxide, cumene hydroperoxide, and the like. These oil soluble or water soluble polymerization initiators can be used singly or in combination of two or more types.

Upon polymerization, it is possible to add various other additives to the polymerization reaction system as needed. The additives may include, for example, polymerization regulators, such as aldehydes, halogenated hydrocarbons, and mercaptans, polymerization inhibitors, such as a phenol compound, a sulfur compound, and an N-oxide compound, and the like. In addition, it is also possible to arbitrarily add a pH adjuster, a crosslinker, and the like.

Upon such polymerization, the polymerization temperature is not particularly limited. It can also be adjusted to a low temperature at approximately 20° C. as well as a high temperature at over 90° C. It is also one of preferred embodiments to use a polymerization vessel with a reflux condenser to enhance the heat removal efficiency of the polymerization reaction system. For the polymerization, it is possible to arbitrarily use additives, such as normally used antiseptics, mildewcides, antiblocking agents, defoamers, antifouling agents, and antistatics, as needed.

The polyvinyl chloride resin composition of the present invention contains a PVA. The PVA used in the present invention preferably has a degree of saponification of from 40 to 99.9 mol %, more preferably from 50 to 98.5 mol %, and particularly preferably from 60 to 96 mol %. The long term thermal stability decreases in a case of the degree of saponification of less than 40 mol %, and thus it is not preferred. The degree of saponification of the PVA is a value measured in accordance with JIS K6726.

The PVA has a viscosity average degree of polymerization (hereinafter, may be referred to simply as a degree of polymerization) of 3000 or less, preferably 2600 or less, and particularly preferably 1700 or less. When the viscosity average degree of polymerization is greater than 3000, the long term thermal stability seriously decreases. The viscosity average degree of polymerization is 100 or more from the perspective of production of the PVA, and preferably 150 or more, and even more preferably 200 or more.

As described later, in a case of adjusting Mw/Mn of the PVA in a method of blending, for instance, PVAs or polyvinyl esters having different degrees of polymerization, each PVA or polyvinyl ester also preferably has a degree of polymerization in the above range.

The viscosity average degree of polymerization of the PVA is a value measured in accordance with JIS K6726. That is, it is a value obtained by the following expression using limiting viscosity [η] that is measured in water at 30° C. after resaponifying the PVA to a degree of saponification of 99.5 mol % or more and purifying it.

$$P=([\eta]\times1000/8.29)^{(1/0.62)}$$

The PVA has the ratio Mw/Mn of the weight average molecular weight Mw to the number average molecular weight Mn of from 2.2 to 4.9, preferably from 2.4 to 4.7, and even more preferably from 2.6 to 4.4. In a case that Mw/Mn of the PVA is greater than 4.9, the long term thermal stability decreases and thus it is not preferred. The number average molecular weight Mn and the weight average molecular weight Mw of the PVA are values measured in accordance with the following method. That is, taking monodisperse polymethyl methacrylate as a standard and using hexafluoroisopropanol containing 20 millimole/liter of sodium trifluoroacetate for a mobile phase, gel permeation chromatography (GPC) measurement is carried out at 40° C. to obtain the weight average molecular weight Mw and the number average molecular weight Mn of the PVA, and Mw/Mn is calculated from the measured values thus obtained.

The method of adjusting Mw/Mn of the PVA may include: a method of blending PVAs having different degrees of polymerization; a method of saponifying a blended product of polyvinyl esters having different degrees of polymerization; a method of carrying out a multistage polymerization reaction of a vinyl ester monomer when producing a polyvinyl ester and adjusting the degree of polymerization in each stage thereof and saponifing the polyvinyl ester thus obtained; a method of adjusting the polymerization conversion of the polymerization reaction of a vinyl ester monomer when producing a polyvinyl ester and saponifing the polyvinyl ester thus obtained; and the like.

The PVA can be produced by polymerizing a vinyl ester monomer by employing a conventionally known process, such as bulk polymerization, solution polymerization, suspension polymerization, emulsion polymerization, and dispersion polymerization, and saponifying the vinyl ester polymer thus obtained. Polymerization processes preferred from the industrial perspective are solution polymerization, emulsion polymerization, and dispersion polymerization. For the polymerization operation, any polymerization system can be employed among batch process, semi-batch process, and continuous process. The vinyl ester monomer allowed to be used for the polymerization may include, for example, vinyl acetate, vinyl formate, vinyl propionate, vinyl caprylate, vinyl versatate, and the like. Among them, vinyl acetate is preferred from the industrial perspective.

Upon the polymerization of the vinyl ester monomer, it is allowed to copolymerize the vinyl ester monomer with another monomer as long as not impairing the spirit of the present invention, but the ratio of vinyl ester units in the polyvinyl ester thus obtained is preferably 95 mol % or more in terms of the long term thermal stability. The ratio of vinyl ester units is more preferably 96 mol % or more and even more preferably 98 mol % or more. The polyvinyl ester is particularly preferred to be a homopolymer of a vinyl ester monomer.

Upon the polymerization of the vinyl ester monomer, for the purpose of adjustment of the degree of polymerization of the PVA thus obtained or the like, a chain transfer agent is allowed to coexist. The chain transfer agent may include aldehydes, such as acetaldehyde, propionaldehyde, butylaldehyde, and benzaldehyde; ketones, such as acetone, methyl ethyl ketone, hexanone, and cyclohexanone; mercaptans, such as 2-hydroxy ethanethiol; and halogenated hydrocarbons, such as trichloroethylene and perchloroethylene, and among all, aldehydes and ketones are used preferably. Although the amount of the chain transfer agent to be added is determined according to the chain transfer constant of the chain transfer agent to be added and the intended degree of polymerization of the PVA, it is generally desired to be from 0.1 to 10 weight % to the vinyl ester monomer.

In the present invention, it is also possible to use a PVA having a high content of 1,2-glycol bond that is obtained by polymerizing the vinyl ester monomer at a temperature condition higher than normal polymerization. In this case, the content of 1,2-glycol bond is preferably 1.9 mol % or more, more preferably 2.0 mol % or more, and even more preferably 2.1 mol % or more.

To the saponification reaction of the polyvinyl ester, an alcoholysis or hydrolysis reaction can be applied using conventionally known basic catalysts, such as sodium hydroxide, potassium hydroxide, and sodium methoxide, or acid catalysts, such as p-toluenesulfonic acid. The solvent used for the saponification reaction may include alcohols, such as methanol and ethanol; esters, such as methyl acetate and ethyl acetate; ketones, such as acetone and methyl ethyl ketone; and aromatic hydrocarbons, such as benzene and toluene, and they can be used singly or in combination of two or more types. Among all, it is preferred for the convenience to carry out a saponification reaction using methanol or a mixed solvent of methanol and methyl acetate in the presence of sodium hydroxide as the basic catalyst.

For adjustment of Mw/Mn in the range described above, the PVA is preferably formed by blending two or more types of PVAs having viscosity average degrees of polymerization different in 500 or more. To have viscosity average degrees of polymerization different in 500 or more means that, among each of the blended PVAs, the difference between the lowest viscosity average degree of polymerization and the highest viscosity average degree of polymerization is 500 or more. A method of obtaining the blended PVA is not particularly limited, and it may be to blend polyvinyl esters in advance before saponification or may also be to blend PVAs after saponification. Normally, there is no change in the viscosity average degree of polymerization of a polymer before and after saponification. In such a manner, a PVA having an accurately adjusted Mw/Mn can be obtained easily.

Although a ratio of blending each PVA served for blending is not particularly limited, among the respective PVAs, the ratio of one having the lowest viscosity average degree of polymerization is preferably from 10 to 90 weight % and more preferably from 20 to 80 weight %. Among the respective PVAs, the highest viscosity average degree of polymerization is preferably from 10 to 90 weight % and more preferably from 20 to 80 weight %. The ratio of blending the respective PVAs is in the above range, thereby facilitating the adjustment of Mw/Mn. Other than the two types of PVAs, a PVA having a different viscosity average degree of polymerization may also be blended further.

The content of the PVA in the polyvinyl chloride resin composition is from 0.005 to 5 parts by weight based on 100 parts by weight of the polyvinyl chloride resin, and preferably from 0.04 to 3 parts by weight. The long term thermal stability of the polyvinyl chloride resin composition thus obtained is not sufficient in a case of less than 0.005 parts by weight, and in a case of exceeding 5 parts by weight, the resin composition is colored and they are not preferred.

Upon production of the polyvinyl chloride resin composition of the present invention, a method of containing a PVA is not particularly limited. Although it may be added during polymerization of vinyl chloride, a method of containing it by adding a PVA to a polyvinyl chloride resin is preferred. This is because, since the PVA acts as a dispersion stabilizer in the method of adding the PVA during polymerization of vinyl chloride, it may influence, or sometimes may adversely affect, the quality of the polyvinyl chloride resin thus obtained, such as the average particle diameter and the plasticizer absorbency. This is also because, since most of the PVA is removed by washing of the polyvinyl chloride resin after producing the resin in the method of adding the PVA during polymerization of vinyl chloride, the content of the PVA becomes less than 0.005 parts by weight based on 100 parts by weight of the polyvinyl chloride resin and thus the effect as a thermal stabilizer is not obtained. The PVA can be added in powder or by being dissolved in water or an organic solvent to the polyvinyl chloride resin.

The polyvinyl chloride resin composition of the present invention may also contain an acid having pKa at 25° C. of from 3.5 to 5.5 and/or a metal salt thereof. The type of the acid is not particularly limited, and the specific examples may include acetic acid (pKa of 4.76), propionic acid (pKa of 4.87), butyric acid (pKa of 4.63), octanoic acid (pKa of 4.89), adipic acid (pKa of 5.03), benzoic acid (pKa of 4.00), formic acid (pKa of 3.55), valeric acid (pKa of 4.63), heptanoic acid (pKa of 4.66), lactic acid (pKa of 3.66), phenylacetic acid (pKa of 4.10), isobutyric acid (pKa of 4.63), cyclohexanecarboxylic acid (pKa of 4.70), and the like. Particularly preferably used acids are acetic acid, propionic acid, and lactic acid. Metal salts of the acids above may also be contained. Although the type of the metal salt is not particularly limited, a salt of alkali metal, such as sodium or potassium, or a salt of alkaline earth metal, such as magnesium or calcium, is normally used.

The acid having pKa of from 3.5 to 5.5 and/or the metal salt thereof is preferably contained from 0.05 to 5 parts by weight based on 100 parts by weight of the PVA, more preferably from 0.1 to 3 parts by weight, and even more preferably from 0.15 to 2 parts by weight. The long term thermal stability decreases in a case that the acid and/or a metal salt thereof is contained less than 0.05 parts by weight to the PVA, and in a case of exceeding 5 parts by weight, the polyvinyl chloride resin is colored and thus they are not preferred. The method of containing the acid and/or a metal salt thereof in a predetermined amount is not particularly limited. It may include, for example, a method of adjusting the type, the amount, and the like of the alkali catalyst used for the saponification when producing the PVA, a method of adding or removing the acid and/or a metal salt thereof after producing the PVA.

The zinc compound used in the present invention may include zinc salts of an organic acid, such as aliphatic carboxylates of zinc, such as zinc stearate, zinc laurate, and zinc oleate, aromatic carboxylates of zinc, such as zinc benzoate and zinc p-tert butyl benzoate, an amino acid zinc salt, and a phosphate zinc salt; inorganic zinc salts, such as zinc oxide and zinc carbonate; and the like. The zinc compound is added from 0.01 to 5 parts by weight based on 100 parts by weight of the polyvinyl chloride resin, and preferably from 0.05 to 3 parts by weight. The long term thermal stability of the polyvinyl chloride resin composition thus obtained is not sufficient in a case that the amount to be added is less than 0.01 parts by weight and in a case that it exceeds 5 parts by weight, and thus they are not preferred. Upon producing the polyvinyl chloride resin composition of the present invention, the zinc compound can be contained by, after obtaining a polyvinyl chloride resin by polymerization, adding it to the polyvinyl chloride resin.

Together with the polyvinyl chloride resin composition of the present invention, it is possible to contain stabilizers, phenolic antioxidants, phosphorous antioxidants, light stabilizers, ultraviolet absorbers, antifog agents, antistatics, flame retardants, lubricants, modifiers, reinforcements, pigments, blowing agents, plasticizers, and the like that are normally used. To the polyvinyl chloride resin composition of the present invention, another resin may also be mixed as long as not impairing the mechanical properties.

The lubricant may include hydrocarbon-based compounds, such as liquid paraffin, natural paraffin, micro wax, and polyethylene wax; fatty acid-based compounds, such as stearic acid and lauric acid; fatty acid amide-based compounds, such as stearic amide, palmitic amide, methylenebisstearoamide, and ethylenebisstearoamide; ester-based compounds, such as lower alcohol esters of fatty acid like butyl stearate, polyol esters of fatty acid like hydrogenated castor oil, fatty acid esters of polyol like ethylene glycol monostearate and glycerin monostearate; and alcohol-based compounds, such as cetyl alcohol and stearyl alcohol. Among all, fatty acid esters of polyol are preferred, and as a fatty acid ester of polyol, glycerin monostearate is more preferred. According to studies by the inventors of the present invention, it was confirmed that adding glycerin monostearate as a lubricant improved the thermal stability of the polyvinyl chloride resin composition. The lubricant is added preferably from 0.001 to 10 parts by weight based on 100 parts by weight of the polyvinyl chloride resin, and even more preferably from 0.05 to 5 parts by weight.

As the stabilizer, well known ones can be used and they may specifically include organic metal salts, such as soap of alkaline earth metals, like calcium soap and barium soap, aluminum soap, and organic phosphoric acid metal salts; inorganic metal salts, such as metal oxide, metal hydroxide, metal carbonate, and inorganic complex metal salts, like zeolite; halogen oxy acid salts, such as barium chlorate, barium perchlorate, and sodium perchlorate; and non-metallic stabilizers, such as β-diketone, polyol, and epoxy compounds.

The plasticizer may include, for example, ester-based plasticizers, such as an ester of an acid, like phthalic acid, trimellitic acid, pyromellitic acid, adipic acid, sebacic acid, and azelaic acid, and a single linear or branched alkyl alcohol, or a mixture thereof, like n-propanol, isopropanol, n-butanol, isobutanol, tert-butanol, n-pentanol, isopentanol, tert-pentanol, n-hexanol, isohexanol, n-heptanol, isoheptanol, n-octanol, isooctanol, 2-ethylhexanol, n-nonanol, isononanol, n-decanol, isodecanol, lauryl alcohol, myristyl alcohol, palmityl alcohol, and stearyl alcohol, and an ester of butanediol and adipic acid; epoxy-based plasticizers, such as epoxidized soybean oil, epoxidized linseed oil, epoxidized castor oil, epoxidized linseed oil fatty acid butyl, octyl epoxy stearate, epoxy triglyceride, diisodecyl epoxy-hexahydrophthalate, or a low molecular weight reaction product of epichlorohydrin with bisphenol A; and phosphate-based plasticizers, such as tricresyl phosphate, trixylenyl phosphate, monobutyl dixylenyl phosphate, and trioctyl phosphate.

The phenolic antioxidant may be any of those used normally, and may include, for example, 2,6-ditertiary butyl-p-cresol, 2,6-diphenyl-4-octadecyloxyphenol, stearyl(3,5-ditertiary butyl-4-hydroxyphenyl)-propionate, distearyl(3,5-ditertiary butyl-4-hydroxybenzyl)phosphonate, thiodiethylene glycol bis[(3,5-ditertiary butyl-4-hydroxyphenyl)propionate], 1,6-hexamethylene bis[(3,5-ditertiary butyl-4-hydroxyphenyl)propionate], 1,6-hexamethylene bis[(3,5-ditertiary butyl-4-hydroxyphenyl)propionic acid amide], 4,4'-thiobis(6-tertiary butyl-m-cresol), 2,2'-methylene bis(4-methyl-6-tertiary butylphenol), 2,2'-methylene bis(4-ethyl-6-tertiary butylphenol), bis[3,3-bis(4-hydroxy-3-tertiary butylphenyl) butyric acid]glycol ester, 2,2'-ethylidene bis(4,6-ditertiary butylphenol), 2,2'-ethylidene bis(4-secondary butyl-6-tertiary butylphenol), 1,1,3-tris(2-methyl-4-hydroxy-5-tertiary butylphenyl)butane, bis[2-tertiary butyl-4-methyl-6-(2-hydroxy-3-tertiary butyl-5-methylbenzyl) phenyl]terephthalate, 1,3,5-tris(3,5-ditertiary butyl-4-hydroxybenzyl)-2,4,6-trimethylbenzene, 1,3,5-tris[(3,5-ditertiary butyl-4-hydroxyphenyl)propionyloxyethyl] isocyanurate, tetrakis[methylene-3-(3,5-ditertiary butyl-4-hydroxyphenyl)propionate]methane, 2-tertiary butyl-4-methyl-6-(2-acryloyloxy-3-tertiary butyl-5-methylbenzyl) phenol, 3,9-bis[1,1-dimethyl-2-{(3-tertiary butyl-4-hydroxy-5-methylphenyl)propionyloxy}ethyl]-2,4,8,10-tetraoxaspiro[5.5]undecane, and triethylene glycol bis[(3-tertiary butyl-4-hydroxy-5-methylphenyl)propionate]. The phenolic antioxidant is added preferably from 0.01 to 5 parts by weight based on 100 parts by weight of the polyvinyl chloride resin, and even more preferably from 0.1 to 3 parts by weight.

The phosphorous antioxidant may be any of those used normally, and may include, for example, trisnonylphenyl phosphite, tris(2,4-ditertiary butylphenyl)phosphite, tris[2-tertiary butyl-4-(3-tertiary butyl-4-hydroxy-5-methylphenylthio)-5-methylphenyl]phosphite, tridecyl phosphite, octyl diphenyl phosphite, di(decyl)monophenyl phosphite, di(tridecyl)pentaerythritol diphosphite, distearyl pentaerythritol diphosphite, di(nonylphenyl)pentaerythritol diphosphite, bis(2,4-ditertiary butylphenyl)pentaerythritol diphosphite, bis(2,6-ditertiary butyl-4-methylphenyl) pentaerythritol diphosphite, bis(2,4,6-tritertiary butylphenyl) pentaerythritol diphosphite, tetra(tridecyl) isopropylidenediphenol diphosphite, tetra(tridecyl)-4,4'-n-butylidenebis(2-tertiary butyl-5-methylphenol)diphosphite, hexa(tridecyl)-1,1,3-tris(2-methyl-4-hydroxy-5-tertiary butylphenyl)butane triphosphite, tetrakis(2,4-ditertiary butylphenyl)biphenylene diphosphonite, 9,10-dihydro-9-oxa-10-phosphaphenanthrene-10-oxide, and 2,2'-methylenebis(4-methyl-6-tertiary butylphenyl)-2-ethylhexyl phosphite. The phosphorous antioxidant is added preferably from 0.001 to 5 parts by weight based on 100 parts by weight of the polyvinyl chloride resin, and even more preferably from 0.005 to 3 parts by weight.

The ultraviolet absorber may include, for example, 2-hydroxybenzophenones, such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2-hydroxyphenyl) benzotriazoles, such as 2-(2-hydroxy-5-tertiary octylphenyl)benzotriazole, 2-(2-hydroxy-3,5-ditertiary butylphenyl)-5-chlorobenzotriazole, 2-(2-hydroxy-3-tertiary butyl-5-methylphenyl)-5-chlorobenzotriazole, 2-(2-hydroxy-3,5-dicumylphenyl)benzotriazole, 2,2'-methylenebis(4-tertiary octyl-6-benzotriazolyl) phenol, and a polyethylene glycol ester of 2-(2-hydroxy-3-tertiary butyl-5-carboxyphenyl)benzotriazole; benzoates, such as phenyl salicylate, resorcinol monobenzoate, 2,4-ditertiary butylphenyl-3,5-ditertiary butyl-4-hydroxybenzoate, and hexadecyl-3,5-ditertiary butyl-4-hydroxybenzoate; substituted oxanilides, such as 2-ethyl-2'-ethoxyoxanilide, and 2-ethoxy-4'-dodecyloxanilide; and cyanoacrylates, such as ethyl-$\alpha$-cyano-$\beta$,$\beta$-diphenylacrylate and methyl-2-cyano-3-methyl-3-(p-methoxyphenyl)acrylate. The ultraviolet absorber is added preferably from 0.005 to 10 parts by weight based on 100 parts by weight of the polyvinyl chloride resin, and even more preferably from 0.01 to 5 parts by weight.

The light stabilizer may include, for example, hindered amine compounds, such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl) sebacate, tetrakis(2,2,6,6-tetramethyl-4-piperidyl)butanetetracarboxylate, tetrakis(1,2,2,6,6-pentamethyl-4-piperidyl)butanetetracarboxylate, bis(1,2,2,6,6-pentamethyl-4-piperidyl)-di(tridecyl)-1,2,3,4-butanetetracarboxylate, bis(1,2,2,6,6-pentamethyl-4-piperidyl)hydroxybenzyl)malonate, a 1-(2-hydroxyethyl)-2,2,6,6-tetramethyl-4-piperidinol/diethyl succinate polycondensation product, a 1,6-bis(2,2,6,6-tetraethyl-4-piperidylamino)hexane/dibromoethane polycondensation product, a 1,6-bis(2,2,6,6-tetramethyl-4-piperidylamino) hexane/2,4-dichloro-6-morpholino-s-triazine polycondensation product, a 1,6-bis(2,2,6,6-tetramethyl-4-piperidylamino)hexane/2,4-dichloro-6-tertiary octylamino-s-triazine polycondensation product, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino]undecane, and 1,6,11-tris[2,4-bis(N-butyl-N-(1,2,2,6,6-pentamethyl-4-piperidyl)amino)-s-triazine-6-ylamino] undecane. The light stabilizer is added preferably from 0.001 to 5 parts by weight based on 100 parts by weight of the polyvinyl chloride resin, and even more preferably from 0.05 to 3 parts by weight.

A method of processing the polyvinyl chloride resin composition of the present invention may include extrusion processing, calender processing, blow molding, press processing, powder molding, injection molding, and the like.

EXAMPLES

The present invention is described below by way of Examples further in detail. In Examples and Comparative Examples below, parts and % denote parts by weight and weight %, respectively, unless otherwise specified.

Example 1

Production of Polyvinyl Chloride Resin

A polyvinyl alcohol, having a degree of polymerization of 850 and having a degree of saponification of 72 mol %, in an amount equivalent to 600 ppm with respect to vinyl chloride was dissolved in 40 parts of deionized water to prepare a dispersion stabilizer. The dispersion stabilizer thus obtained was charged in a glass-lined autoclave on which an antifouling agent, NOXOL WSW (produced by CIRS) was applied so as to have a solid content of 0.3 g/m$^2$. Subsequently, 0.04 parts of a 70% toluene solution of diisopropyl peroxydicarbonate was charged in the glass-lined autoclave, and after removing oxygen by degassing until the pressure in the autoclave became 0.0067 MPa, 30 parts of vinyl chloride was charged therein and the contents in the autoclave were raised in temperature to 57° C. while being stirred to initiate polymerization. The pressure in the autoclave when initializing the polymerization was 0.83 MPa. After seven hours since the initiation of polymerization, the polymerization was terminated at the time of the pressure in the autoclave being 0.44 MPa, and unreacted vinyl chloride was removed, followed by taking the polymerization reaction product out to dry it at 65° C. overnight, and thus a polyvinyl chloride resin (PVC) was obtained.

(Production of PVA)

In a reaction vessel, 2400 g of vinyl acetate, 600 g of methanol, and 220 g of acetaldehyde were charged and inside the reaction vessel was purged with nitrogen by bubbling with a nitrogen gas. The reaction vessel was initiated to be raised in temperature, and when the internal temperature became at 60° C., 0.6 g of 2,2'-azobisisobutyronitrile was added in the reaction vessel to initiate polymerization. During the polymerization, the polymerization temperature was maintained at 60° C. The reaction vessel was cooled 4.5 hours after the initiation of polymerization to terminate the polymerization. The polymerization conversion at this time was 50%. Subsequently, while sometimes adding methanol at 30° C. under reduced pressure, unreacted vinyl acetate monomers were removed to obtain a methanol solution of polyvinyl acetate A (concentration of 60%).

The degree of polymerization of polyvinyl acetate A was measured as below. That is, a portion is obtained from the methanol solution of polyvinyl acetate A, and a methanol solution of sodium hydroxide with a concentration of 10% is added thereto so as to make an alkali molar ratio (a molar ratio of the alkali compound with respect to vinyl acetate units in the polyvinyl acetate) to be 0.5 and it was left at 60° C. for five hours to proceed saponification. After finishing the saponification, soxhlet extraction was performed with methanol for three days, and subsequently, it was vacuum dried at 80° C. for three days to obtain a purified polyvinyl alcohol. The degree of polymerization of the polyvinyl alcohol was 300 that was measured in accordance with an ordinary method of JIS K6726. It was thus found that polyvinyl acetate A had a degree of polymerization of 300.

Using 2400 g of vinyl acetate, 600 g of methanol, 26.5 g of acetaldehyde, and 0.6 g of 2,2'-azobisisobutyronitrile, polymerization was carried out in a same manner as above to obtain polyvinyl acetate B having a degree of polymerization of 1200.

The polyvinyl acetate A having a degree of polymerization of 300 and the polyvinyl acetate B having a degree of polymerization of 1200 produced above were blended at a weight ratio of 45/55. This polyvinyl acetate was dissolved in methanol to prepare a methanol solution of a polyvinyl acetate with a concentration of 55%, and water, methanol, methyl acetate, and a methanol solution of sodium hydroxide with a concentration of 10% were added so as to make the polyvinyl acetate to be 30%, the water to be 1%, the methyl acetate to be 30%, and the alkali molar ratio to be 0.02 for saponification of the polyvinyl acetate. The product gelled approximately five minutes after addition of alkali was ground in a grinder and was left at 40° C. for one hour and was centrifugally deliquored, followed by being dried in a dryer at 60° C. for one day to obtain a polyvinyl alcohol. The degree of polymerization and the degree of saponification of the polyvinyl alcohol were 740 and 72 mol % that were respectively measured in accordance with JIS K6726. The ratio Mw/Mn of the weight average molecular weight Mw to the number average molecular weight measured in the method described above was 3.1. The sodium acetate content measured by isotachophoresis was 1.8%.

(Fabrication of Resin Composition Sheet)

To 100 parts by weight of the polyvinyl chloride resin, an aqueous PVA solution with a concentration of 1% was added so as to make the PVA in 1 part by weight, and it was dried in a vacuum dryer at 50° C. for eight hours. To the polyvinyl chloride resin composition, 2 parts by weight of zinc stearate, 1 part by weight of calcium stearate, and 20 parts by weight of dioctyl phthalate were mixed. This vinyl chloride resin composition was kneaded at 160° C. for five minutes with a test roll to fabricate a sheet having a thickness of 0.45 mm.

(Thermal Stability Test)

The sheet obtained from the test roll was cut into 50×70 mm to make a test piece. The test piece was put into a gear oven, and the time period until it was completely blackened at a temperature of 180° C. was measured to make it an index of the long term thermal stability.

(Colorability Test)

The sheet obtained from the test roll was cut into 45×30 mm, and several sheet pieces thus obtained were stacked and pressed at 185° C. for five minutes to fabricate a test piece having a thickness of 5 mm, and the colorability was compared visually and determined in accordance with the following standards.

A: almost not colored
B: slightly colored
C: yellow-browned

Example 2

Production of Polyvinyl Chloride Resin

A polyvinyl chloride resin (PVC) was obtained in the same way as Example 1.

(Production of PVA)

In a reaction vessel, 2400 g of vinyl acetate, 600 g of methanol, and 98 g of acetaldehyde were charged and inside the reaction vessel was purged with nitrogen by bubbling with a nitrogen gas. The reaction vessel was initiated to be raised in temperature, and when the internal temperature became at 60° C., 0.6 g of 2,2'-azobisisobutyronitrile was added in the reaction vessel to initiate polymerization. During the polymerization, the polymerization temperature was maintained at 60° C. The reaction vessel was cooled 4.5 hours after the initiation of polymerization to terminate the polymerization. The polymerization conversion at this time was 50%. Subsequently, while sometimes adding methanol at 30° C. under reduced pressure, unreacted vinyl acetate monomers were removed to obtain a methanol solution of polyvinyl acetate C (concentration of 60%). As a result of measuring the degree of polymerization in the same way as Example 1, it was 500.

Also in the same way as Example 1, polyvinyl acetate B having a degree of polymerization of 1200 was obtained.

The polyvinyl acetate C having a degree of polymerization of 500 and the polyvinyl acetate B having a degree of polymerization of 1200 produced above were blended at a weight ratio of 60/40. This polyvinyl acetate was dissolved in methanol to prepare a methanol solution of a polyvinyl acetate with a concentration of 55%, and water, methanol, methyl acetate, and a methanol solution of sodium hydroxide with a concentration of 10% were added so as to make the polyvinyl acetate to be 30%, the water to be 1%, the methyl acetate to be 30%, and the alkali molar ratio to be 0.02 for saponification of the polyvinyl acetate. The product gelled approximately five minutes after addition of alkali was ground in a grinder and was left at 40° C. for one hour and was centrifugally deliquored, followed by being dried in a dryer at 60° C. for one day to obtain a polyvinyl alcohol. The degree of polymerization and the degree of saponification of the polyvinyl alcohol were 750 and 72 mol % that were respectively measured in accordance with JIS K6726. The ratio Mw/Mn of the weight average molecular weight Mw to the number average molecular weight measured in the method described above was 2.4. The sodium acetate content measured by isotachophoresis was 1.8%.

In the same way as Example 1, a resin composition sheet was fabricated using the PVA and the thermal stability test and the colorability test were performed. Evaluation results are shown in Table 1.

Example 3

Production of Polyvinyl Chloride Resin

A polyvinyl chloride resin (PVC) was obtained in the same way as Example 1.
(Production of PVA)

In a reaction vessel, 2400 g of vinyl acetate, 600 g of methanol, and 245 g of acetaldehyde were charged and inside the reaction vessel was purged with nitrogen by bubbling with a nitrogen gas. The reaction vessel was initiated to be raised in temperature, and when the internal temperature became at 60° C., 0.6 g of 2,2'-azobisisobutyronitrile was added in the reaction vessel to initiate polymerization. During the polymerization, the polymerization temperature was maintained at 60° C. The reaction vessel was cooled 4.5 hours after the initiation of polymerization to terminate the polymerization. The polymerization conversion at this time was 50%. Subsequently, while sometimes adding methanol at 30° C. under reduced pressure, unreacted vinyl acetate monomers were removed to obtain a methanol solution of polyvinyl acetate D (concentration of 60%). As a result of measuring the degree of polymerization in the same way as Example 1, it was 230.

In addition, 2400 g of vinyl acetate, 600 g of methanol, and 15 g of acetaldehyde were charged in a reaction vessel and polyvinyl acetate E having a degree of polymerization of 1550 was obtained in the same manner.

The polyvinyl acetate D having a degree of polymerization of 230 and the polyvinyl acetate E having a degree of polymerization of 1550 produced above were blended at a weight ratio of 50/50. This polyvinyl acetate was dissolved in methanol to prepare a methanol solution of a polyvinyl acetate with a concentration of 55%, and water, methanol, methyl acetate, and a methanol solution of sodium hydroxide with a concentration of 10% were added so as to make the polyvinyl acetate to be 30%, the water to be 1%, the methyl acetate to be 30%, and the alkali molar ratio to be 0.02 for saponification of the polyvinyl acetate. The product gelled five minutes after addition of alkali was ground in a grinder and was left at 40° C. for one hour and was centrifugally deliquored, followed by being dried in a dryer at 60° C. for one day to obtain a polyvinyl alcohol. The degree of polymerization and the degree of saponification of the polyvinyl alcohol were 760 and 72 mol % that were respectively measured in accordance with JIS K6726. The ratio Mw/Mn of the weight average molecular weight Mw to the number average molecular weight measured in the method described above was 4.4. The sodium acetate content measured by isotachophoresis was 1.8%.

In the same way as Example 1, a resin composition sheet was fabricated using the PVA and the thermal stability test and the colorability test were performed. Evaluation results are shown in Table 1.

Example 4

Production of Polyvinyl Chloride Resin

A polyvinyl chloride resin (PVC) was obtained in the same way as Example 1.
(Production of PVA)

In a reaction vessel, 2400 g of vinyl acetate, 600 g of methanol, and 45 g of acetaldehyde were charged and inside the reaction vessel was purged with nitrogen by bubbling with a nitrogen gas. The reaction vessel was initiated to be raised in temperature, and when the internal temperature became at 60° C., 0.6 g of 2,2'-azobisisobutyronitrile was added in the reaction vessel to initiate polymerization. During the polymerization, the polymerization temperature was maintained at 60° C. The reaction vessel was cooled 7.0 hours after the initiation of polymerization to terminate the polymerization. The polymerization conversion at this time was 75%. Subsequently, while sometimes adding methanol at 30° C. under reduced pressure, unreacted vinyl acetate monomers were removed to obtain a methanol solution of polyvinyl acetate F (concentration of 60%). As a result of measuring the degree of polymerization in the same way as Example 1, it was 700.

The polyvinyl acetate F having a degree of polymerization of 700 produced above was dissolved in methanol to prepare a methanol solution of a polyvinyl acetate with a concentration of 55%, and water, methanol, methyl acetate, and a methanol solution of sodium hydroxide with a concentration of 10% were added so as to make the polyvinyl acetate to be 30%, the water to be 1%, the methyl acetate to be 30%, and the alkali molar ratio to be 0.02 for saponification of the polyvinyl acetate. The product gelled approximately five minutes after addition of alkali was ground in a grinder and was left at 40° C. for one hour and was centrifugally deliquored, followed by being dried in a dryer at 60° C. for one day to obtain a polyvinyl alcohol. The degree of polymerization and the degree of saponification of the polyvinyl alcohol were 700 and 68 mol % that were respectively measured in accordance with JIS K6726. The ratio Mw/Mn of the weight average molecular weight Mw to the number average molecular weight measured in the method described above was 2.4. The sodium acetate content measured by isotachophoresis was 1.8%.

Example 5

Using the polyvinyl alcohol used in Example 1, the aqueous PVA solution was added to the polyvinyl chloride resin and it was dried in the same way as Example 1. In the same way as Example 1 other than adding 0.5 parts by weight of glycerin monostearate as a lubricant to the polyvinyl chloride resin composition, a sheet was fabricated and the thermal stability test and the colorability test were performed. The results are shown in Table 1.

Example 6

Using the polyvinyl alcohol used in Example 2, the aqueous PVA solution was added to the polyvinyl chloride resin and it was dried in the same way as Example 2. In the same way as Example 2 other than adding 0.5 parts by weight of glycerin monostearate as a lubricant to the polyvinyl chloride resin composition, a sheet was fabricated and the thermal stability test and the colorability test were performed. The results are shown in Table 1.

Example 7

Using the polyvinyl alcohol used in Example 3, the aqueous PVA solution was added to the polyvinyl chloride resin and it was dried in the same way as Example 3. In the same way as Example 3 other than adding 0.5 parts by weight of glycerin monostearate as a lubricant to the polyvinyl chloride resin composition, a sheet was fabricated and the thermal stability test and the colorability test were performed. The results are shown in Table 1.

Comparative Example 1

On 100 parts by weight of the PVA obtained in Example 4, a washing method of immersing at 50° C. for one hour using 500 parts by weight of a mixed solvent of methanol/methyl acetate (mixing ratio [wt] of 1:1) and centrifugal deliquoring was repeated three times. After washing, the degree of polymerization and the degree of saponification of the polyvinyl alcohol were measured in the same method as Example 4 and the results were 750 and 72 mol %. The ratio Mw/Mn of the weight average molecular weight Mw to the number average molecular weight measured in the method described above was 1.9. The sodium acetate content measured by isotachophoresis was 0.4%. Using the PVA, test pieces were fabricated in the same way as Example 1, the long term thermal stability and the colorability were evaluated. The evaluation results are shown in Table 1. The long term thermal stability was not sufficient.

Comparative Example 2

Production of Polyvinyl Chloride Resin

A polyvinyl chloride resin (PVC) was obtained in the same way as Example 1.
(Production of PVA)

In a reaction vessel, 2400 g of vinyl acetate, 600 g of methanol, and 280 g of acetaldehyde were charged and inside the reaction vessel was purged with nitrogen by bubbling with a nitrogen gas. The reaction vessel was initiated to be raised in temperature, and when the internal temperature became at 60° C., 0.6 g of 2,2'-azobisisobutyronitrile was added in the reaction vessel to initiate polymerization. During the polymerization, the polymerization temperature was maintained at 60° C. The reaction vessel was cooled 4.5 hours after the initiation of polymerization to terminate the polymerization. The polymerization conversion at this time was 50%. Subsequently, while sometimes adding methanol at 30° C. under reduced pressure, unreacted vinyl acetate monomers were removed to obtain a methanol solution of polyvinyl acetate G (concentration of 60%). As a result of measuring the degree of polymerization in the same way as Example 1, it was 200.

In addition, 2400 g of vinyl acetate, 600 g of methanol, and 10 g of acetaldehyde were charged in a reaction vessel and polyvinyl acetate H having a degree of polymerization of 1770 was obtained in the same manner.

The polyvinyl acetate G having a degree of polymerization of 200 and the polyvinyl acetate H having a degree of polymerization of 1770 produced above were blended at a weight ratio of 55/45. This polyvinyl acetate was dissolved in methanol to prepare a methanol solution of a polyvinyl acetate with a concentration of 55%, and water, methanol, methyl acetate, and a methanol solution of sodium hydroxide with a concentration of 10% were added so as to make the polyvinyl acetate to be 30%, the water to be 1%, the methyl acetate to be 30%, and the alkali molar ratio to be 0.02 for saponification of the polyvinyl acetate. The product gelled approximately five minutes after addition of alkali was ground in a grinder and was left at 40° C. for one hour and was centrifugally deliquored, followed by being dried in a dryer at 60° C. for one day to obtain a polyvinyl alcohol. The degree of polymerization and the degree of saponification of the polyvinyl alcohol were 750 and 72 mol % that were respectively measured in accordance with JIS K6726. The ratio Mw/Mn of the weight average molecular weight Mw to the number average molecular weight measured in the method described above was 5.5. The sodium acetate content measured by isotachophoresis was 1.8%.

In the same way as Example 1, a resin composition sheet was fabricated using the PVA and the thermal stability test and the colorability test were performed. Evaluation results are shown in Table 1.

Comparative Examples 3 and 4

Test pieces were fabricated in the same way as Example 1 other than modifying the amount of the PVA to be blended in Example 1 with respect to the polyvinyl chloride resin (PVC) to be shown in Table 1, and the long term thermal stability and the colorability were evaluated. Evaluation results are shown in Table 1. It was colored in yellow-brown in a case that the PVA was blended too much. In a case of too little, the long term thermal stability was not sufficient.

Comparative Example 5

Test pieces were fabricated in the same way as Example 1 other than not adding the PVA in Example 1 to the polyvinyl chloride resin, and the long term thermal stability and the colorability were evaluated. Evaluation results are shown in Table 1. The long term thermal stability was not sufficient.

Comparative Examples 6 and 7

Test pieces were fabricated in the same way as Example 1 other than modifying the amount of the zinc stearate to be added in Example 1 to be shown in Table 1, and the long term thermal stability and the colorability were evaluated. Evaluation results are shown in Table 1. Either of them was insufficient in the long term thermal stability.

Comparative Example 8

Using the polyvinyl alcohol used in Comparative Example 1, the aqueous PVA solution was added to the polyvinyl chloride resin and it was dried in the same way as Comparative Example 1. In the same way as Comparative Example 1 other than adding 0.5 parts by weight of glycerin monostearate as a lubricant to the polyvinyl chloride resin composition, a sheet was fabricated and the thermal stability test and the colorability test were performed. The results are shown in Table 1.

Comparative Example 9

Using the polyvinyl alcohol used in Comparative Example 2, the aqueous PVA solution was added to the polyvinyl chloride resin and it was dried in the same way as Comparative Example 2. In the same way as Comparative Example 2 other than adding 0.5 parts by weight of glycerin monostearate as a lubricant to the polyvinyl chloride resin composition, a sheet was fabricated and the thermal stability test and the colorability test were performed. The results are shown in Table 1.

TABLE 1

| | PVA | | | | Evaluation Conditions and Results | | | |
|---|---|---|---|---|---|---|---|---|
| | Degree of Polymerization | Degree of Saponification (mol %) | Mw/Mn | PVA (parts/PVC) | Zinc Compound (parts/PVC) | Glycerin Monostearate (parts/PVC) | Time Period to be Blackened (minutes) | Colorability |
| Example 1 | 740 | 72 | 3.1 | 1 | 2 | 0.0 | 180 | A |
| Example 2 | 750 | 72 | 2.4 | 1 | 2 | 0.0 | 150 | A |
| Example 3 | 760 | 72 | 4.4 | 1 | 2 | 0.0 | 120 | A |
| Example 4 | 700 | 68 | 2.4 | 1 | 2 | 0.0 | 100 | A |
| Example 5 | 740 | 72 | 3.1 | 1 | 2 | 0.5 | 210 | A |
| Example 6 | 750 | 72 | 2.4 | 1 | 2 | 0.5 | 180 | A |
| Example 7 | 760 | 72 | 4.4 | 1 | 2 | 0.5 | 150 | A |
| Comparative Example 1 | 750 | 72 | 1.9 | 1 | 2 | 0.0 | 95 | B |
| Comparative Example 2 | 750 | 72 | 5.5 | 1 | 2 | 0.0 | 90 | B |
| Comparative Example 3 | 740 | 72 | 3.1 | 0.001 | 2 | 0.0 | 60 | B |
| Comparative Example 4 | 740 | 72 | 3.1 | 10 | 2 | 0.0 | 180 | C |
| Comparative Example 5 | — | — | — | None | 2 | 0.0 | 60 | A |
| Comparative Example 6 | 740 | 72 | 3.1 | 1 | 0.001 | 0.0 | 80 | A |
| Comparative Example 7 | 740 | 72 | 3.1 | 1 | 10 | 0.0 | 95 | A |
| Comparative Example 8 | 750 | 72 | 1.9 | 1 | 2 | 0.5 | 100 | B |
| Comparative Example 9 | 750 | 72 | 5.5 | 1 | 2 | 0.5 | 100 | B |

The invention claimed is:

1. A polyvinyl chloride resin composition, comprising:
   from 0.005 to 5 parts by weight of a polyvinyl alcohol having a viscosity average degree of polymerization of from 100 to 3000 and having a ratio Mw/Mn of a weight average molecular weight Mw to a number average molecular weight Mn of from 2.2 to 4.9;
   from 0.01 to 5 parts by weight of a zinc compound; and
   100 parts by weight of a polyvinyl chloride resin.

2. The polyvinyl chloride resin composition of claim 1, wherein the polyvinyl alcohol is formed by saponifying a polyvinyl ester comprising 95 mol % or more of vinyl ester units, based on a total molar amount of vinyl units.

3. The polyvinyl chloride resin composition of claim 1, wherein the polyvinyl alcohol is formed by blending two or more polyvinyl alcohols having viscosity average degrees of polymerization differing by 500 or more.

4. The polyvinyl chloride resin composition of claim 1, further comprising:
   from 0.001 to 10 parts by weight of a lubricant based on 100 parts by weight of the polyvinyl chloride resin.

5. The polyvinyl chloride resin composition of claim 4, wherein the lubricant is a fatty acid ester of a polyol.

6. A method of producing a polyvinyl chloride resin composition, comprising adding:
   from 0.005 to 5 parts by weight of a polyvinyl alcohol having a viscosity average degree of polymerization of from 100 to 3000 and having a ratio Mw/Mn of a weight average molecular weight Mw to a number average molecular weight Mn of from 2.2 to 4.9; and
   from 0.01 to 5 parts by weight of a zinc compound, to 100 parts by weight of a polyvinyl chloride resin.

7. The method of claim 6, wherein the polyvinyl alcohol is formed by blending two or more types of polyvinyl alcohols having viscosity average degrees of polymerization differing by 500 or more.

8. The polyvinyl chloride resin composition of claim 2, further comprising:
   from 0.001 to 10 parts by weight of a lubricant based on 100 parts by weight of the polyvinyl chloride resin.

9. The polyvinyl chloride resin composition of claim 3, further comprising:
   from 0.001 to 10 parts by weight of a lubricant based on 100 parts by weight of the polyvinyl chloride resin.

10. The polyvinyl chloride resin composition of claim 4, wherein the lubricant is glycerin monostearate.

11. The polyvinyl chloride resin composition of claim 2, wherein the polyvinyl alcohol has a degree of saponification of 40 to 99.9 mol %.

12. The polyvinyl chloride resin composition of claim 2, wherein the polyvinyl alcohol has a degree of saponification of 50 to 98.5 mol %.

13. The polyvinyl chloride resin composition of claim 2, wherein the polyvinyl alcohol has a degree of saponification of 60 to 96 mol %.

14. The polyvinyl chloride resin composition of claim 1, wherein the polyvinyl alcohol has a viscosity average degree of polymerization of 150 to 3000.

15. The polyvinyl chloride resin composition of claim 1, wherein the polyvinyl alcohol has a viscosity average degree of polymerization of 150 to 2600.

16. The polyvinyl chloride resin composition of claim 1, wherein the polyvinyl alcohol has a viscosity average degree of polymerization of 200 to 1700.

17. The polyvinyl chloride resin composition of claim 1, wherein the ratio Mw/Mn of the polyvinyl alcohol is in a range of 2.4 to 4.7.

18. The polyvinyl chloride resin composition of claim 1, wherein the ratio Mw/Mn of the polyvinyl alcohol is in a range of 2.6 to 4.4.

19. The polyvinyl chloride resin composition of claim 1, comprising from 0.04 to 3 parts by weight of the polyvinyl alcohol, based on 100 parts by weight of a polyvinyl chloride resin.

20. The polyvinyl chloride resin composition of claim 1, wherein the zinc compound is at least one zinc salt of an organic acid.

* * * * *